(12) United States Patent
Manavoglu et al.

(10) Patent No.: US 12,579,358 B2
(45) Date of Patent: Mar. 17, 2026

(54) SUPPLEMENTAL CONTENT AND GENERATIVE LANGUAGE MODELS

(71) Applicant: Microsoft Technology Licensing, LLC, Redmond, WA (US)

(72) Inventors: Eren Manavoglu, Menlo Park, CA (US); Debapriya Basu, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 63 days.

(21) Appl. No.: 18/478,934

(22) Filed: Sep. 29, 2023

(65) Prior Publication Data

US 2024/0256757 A1     Aug. 1, 2024

Related U.S. Application Data

(60) Provisional application No. 63/442,747, filed on Feb. 1, 2023.

(51) Int. Cl.
| | |
|---|---|
| *G06F 40/134* | (2020.01) |
| *G06F 3/0481* | (2022.01) |
| *G06F 3/04842* | (2022.01) |
| *G06F 16/954* | (2019.01) |
| *G06F 40/279* | (2020.01) |
| *G06F 16/953* | (2019.01) |

(52) U.S. Cl.
CPC .......... *G06F 40/134* (2020.01); *G06F 3/0481* (2013.01); *G06F 3/04842* (2013.01); *G06F 16/954* (2019.01); *G06F 40/279* (2020.01); *G06F 16/953* (2019.01)

(58) Field of Classification Search
None
See application file for complete search history.

(56) References Cited

U.S. PATENT DOCUMENTS

| | | | | |
|---|---|---|---|---|
| 2013/0174034 | A1* | 7/2013 | Brown | G06F 16/951 |
| | | | | 715/708 |
| 2019/0349477 | A1* | 11/2019 | Kotak | H04M 3/4878 |
| 2020/0050942 | A1* | 2/2020 | Sun | G06N 3/044 |
| 2025/0005303 | A1* | 1/2025 | Gray | G06F 16/3328 |

OTHER PUBLICATIONS

Adlakha, et al., "TopiOCQA: Open-domain Conversational Question Answering with Topic Switching", In Repository of arXiv:2110. 00768v1, Oct. 2, 2021, 17 Pages.

(Continued)

*Primary Examiner* — Thanh T Vu
(74) *Attorney, Agent, or Firm* — CALFEE, HALTER & GRISWOLD LLP

(57) ABSTRACT

A computing system includes a processor and memory storing instructions that, when executed by the processor, cause the processor to perform several acts. The acts include providing a prompt to a generative language model, where the generative language model generates output based upon the prompt, identifies text in the output that is to be associated with a supplemental content item, and assigning a hyperlink to the text in the output. Upon the hyperlink being selected or hovered over, the supplemental content item is displayed.

19 Claims, 12 Drawing Sheets

(56)             References Cited

OTHER PUBLICATIONS

International Search Report and Written Opinion received for PCT Application No. PCT/US2024/013482, May 17, 2024, 13 pages.
Nakano, et al., "Webgpt: Browser-assisted question-answering with human feedback", In Repository of arXiv:2112.09332v1, Dec. 17, 2021, 30 Pages.
International Preliminary Report on Patentability (Chapter I) received for PCT Application No. PCT/US2024/013482, mailed on Aug. 14, 2025, 8 pages.

* cited by examiner

I WOULD LIKE TO BOOK A FLIGHT

HELLO – I AM THE AGENT FOR COMPANY - WHERE ARE YOU GOING?

I'M GOING TO SPAIN IN APRIL

ROUND TRIP?

202

400

COMPANY

I AM AN ASSISTANT FOR "COMPANY" - HOW CAN I HELP?

SUPPLEMENTAL CONTENT

204

202

200

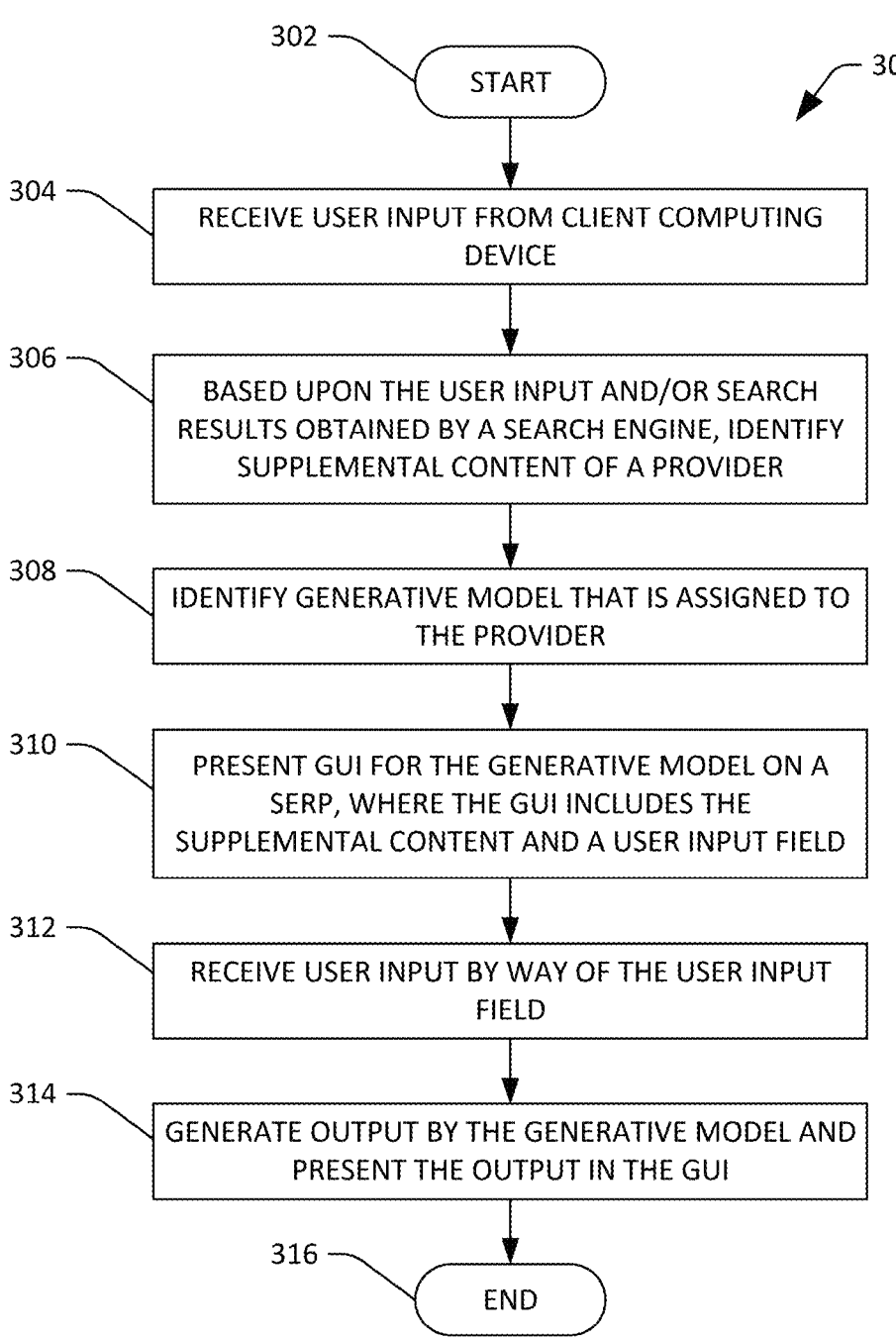

302 — START

300

304 — RECEIVE USER INPUT FROM CLIENT COMPUTING DEVICE

306 — BASED UPON THE USER INPUT AND/OR SEARCH RESULTS OBTAINED BY A SEARCH ENGINE, IDENTIFY SUPPLEMENTAL CONTENT OF A PROVIDER

308 — IDENTIFY GENERATIVE MODEL THAT IS ASSIGNED TO THE PROVIDER

310 — PRESENT GUI FOR THE GENERATIVE MODEL ON A SERP, WHERE THE GUI INCLUDES THE SUPPLEMENTAL CONTENT AND A USER INPUT FIELD

312 — RECEIVE USER INPUT BY WAY OF THE USER INPUT FIELD

314 — GENERATE OUTPUT BY THE GENERATIVE MODEL AND PRESENT THE OUTPUT IN THE GUI

316 — END

FIG. 3

402 — START

400

404 — RECEIVE INDICATION THAT A WEBPAGE OF A WEBSITE OF A PROVIDER HAS BEEN ACCESSED

406 — CAUSE A GUI OF A GENERATIVE MODEL FOR THE PROVIDER TO BE PRESENTED ON THE WEBPAGE

408 — RECEIVE USER INPUT SET FORTH BY WAY OF AN INPUT FIELD OF THE GUI

410 — GENERATE OUTPUT BY THE GENERATIVE MODEL BASED UPON A PROMPT

412 — CAUSE OUTPUT TO BE PRESENTED IN THE GUI ON THE WEBPAGE

414 — END

602 — START

600

604 — RECEIVE USER INPUT AT FIRST GENERATIVE MODEL

606 — GENERATE OUTPUT BY THE FIRST GENERATIVE MODEL

608 — PROVIDE OUTPUT TO SUPPLEMENTAL CONTENT PROVISION SYSTEM

610 — IDENTIFY SECOND GENERATIVE MODEL BASED UPON THE OUTPUT GENERATED BY THE FIRST GENERATIVE MODEL

612 — CAUSE OUTPUT OF SECOND GENERATIVE MODEL TO BE PRESENTED IN THE GUI ON THE WEBPAGE

614 — END

700

WHEN IS THE BEST TIME TO VISIT SKOPOLOS IN GREECE?

THE BEST TIME TO VISIT ATHENS IS IN THE SUMMER MONTHS OF JUNE, JULY, AND AUGUST WHEN THE WEATHER IS WARM AND SUNNY. AS YOU PLAN YOUR TRIP IT SHOULD BE NOTED THAT THERE ARE NO DIRECT FLIGHTS FROM YOUR CITY TO SKOPOLOS; HOWEVER, THERE ARE MANY FLIGHTS THAT CONNECT THROUGH ATHENS.

CHEAP FLIGHTS TO ATHENS | FIND GREAT DEALS

202

802 — START

800

804 — RECEIVE USER INPUT AT GENERATIVE MODEL

806 — GENERATE OUTPUT BASED UPON THE USER INPUT

808 — IDENTIFY TEXT IN THE OUTPUT THAT CORRESPONDS TO A SUPPLEMENTAL CONTENT ITEM

810 — ASSIGN A HYPERLINK TO THE TEXT IN THE OUTPUT

812 — END

1002 — START

1000

1004 — RECEIVE SUPPLEMENTAL CONTENT ITEM AND/OR INFORMATION ABOUT THE SUPPLEMENTAL CONTENT ITEM

1006 — GENERATE OUTPUT BASED UPON THE SUPPLEMENTAL CONTENT ITEM AND/OR INFORMATION

1008 — UPDATE SUPPLEMENTAL CONTENT ITEM TO INCLUDE THE OUTPUT

1010 — END

1200

1202

WHAT WAS THE CAR FROM "MOVIE"

"MOVIE" IS A FILM ABOUT A GETAWAY DRIVER WHO USES HIS INCREDIBLE EYESIGHT TO AVOID ACCIDENTS. THE CAR HE DRIVES IN THE OPENING SCENE IS "CAR Z"

IF YOU ARE INTERESTED, THERE'S SOME OFFERS AT CAR Z AT YOUR LOCAL DEALER:

202

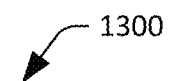
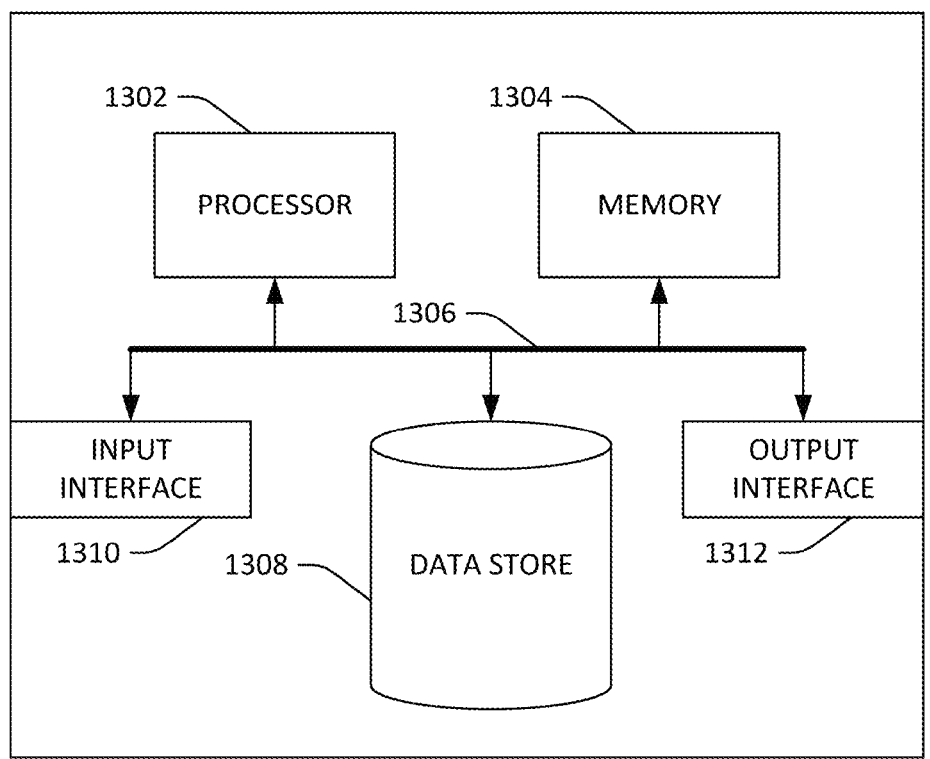
FIG. 13

SUPPLEMENTAL CONTENT AND GENERATIVE LANGUAGE MODELS

RELATED APPLICATION

This application claims priority to U.S. Provisional Patent Application No. 63/442,747, filed Feb. 1, 2023, and entitled "SUPPLEMENTAL CONTENT AND GENERATIVE LANGUAGE MODELS," the entirety of which is incorporated herein by reference.

BACKGROUND

Supplemental content is often presented with primary content on webpages. In an example, a search engine results page (SERP) typically includes hyperlinks to webpages (or web applications) identified as being relevant to a received query, a knowledge card that sets forth information about an entity referenced in the query, an instant answer that answers a question posed in the query, and supplemental content. In some embodiments, the supplemental content is a sponsored search result. In another example, a publisher publishes content on a webpage. The webpage may also include supplemental content that is relevant to content of the webpage and/or relevant to interests of viewers of the webpage.

Relatively recently, generative models, including generative language models (GLMs) (also referred to as large language models (LLMs)) have been developed. An example of a GLM is the Generative Pre-trained Transformer 4 (GPT-4). Another example of a GLM is the BigScience Language Open-science Open-access Multilingual (BLOOM) model, which is also a transformer-based model. Briefly, a generative model is configured to generate an output (such as text in human language, source code, music, video, and the like) based upon a prompt, where the prompt typically includes input set forth by a user. The generative model generates the output in near real-time (e.g., within a few seconds of receiving the prompt). The generative model further generates output based upon training data over which the generative model has been trained.

Currently, practical use of generative models is fairly limited. For instance, users of a generative model often request that the generative model generate poetry, provide biographical information on a famous person, provide information on a topic of interest to a user, and so forth. There has been no use of a generative model in connection with improving provision of supplemental content to search engine users and/or webpage viewers. Further, heretofore technologies that are configured to provide supplemental content to end users have not been meaningfully integrated with generative models.

SUMMARY

The following is a brief summary of subject matter that is described in greater detail herein. This summary is not intended to be limiting as to the scope of the claims.

Various technologies pertaining to utilization of a generative model in connection with providing supplemental content to viewers of webpages (or web applications) are described herein. As used herein, the term "webpage" is intended to cover both a conventional webpage and a web application. A computing environment described herein includes a computing system and a client computing device that is in communication with the computing system by way of a network. The computing system executes a generative model and a supplemental content provision system. The computing system further optionally executes a search engine. The supplemental content provision system identifies supplemental content that is to be provided on a webpage to a viewer of the webpage (where the webpage can be a search engine results page (SERP) or some other suitable webpage). As will be described in greater detail herein, the generative model is employed to improve provision of supplemental content to viewers of webpages.

In a non-limiting example, the search engine receives a query from a client computing device and generates a search engine results page (SERP) based upon the query. The generative model is integrated with the search engine, and an interface for the generative model can be included in the SERP. Hence, the user of the client computing device can set forth input to the generative model by way of the aforementioned interface in the SERP. In addition, the generative model can be provided with at least some of the information in the SERP as input (as part of a prompt), such that output generated by the generative model is based upon content of the SERP.

The input provided to the generative model (e.g., by the user or from information in the SERP) may pertain to a specific entity, such as a company that is offering goods or services for acquisition, a product that may be available by way of the company, a service that may be available by way of the company, etc. The generative model can identify that the input pertains to the company and can identify a second generative model that is unique to the company (e.g., has been trained to provide output pertaining to the company, including information about products available from the company, offers of the company, and so forth). The second generative model may then provide output to the user about the entity. In this example, output of the second generative model can be supplemental content. Various other examples of provision of supplemental content based upon output of a generative model are described herein.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 3 is a flow diagram that illustrates a method for providing output generated by a generative model to a user, where the generative model is selected from amongst several generative models.

FIG. 13 depicts an example computing device.

DETAILED DESCRIPTION

Figure 1:
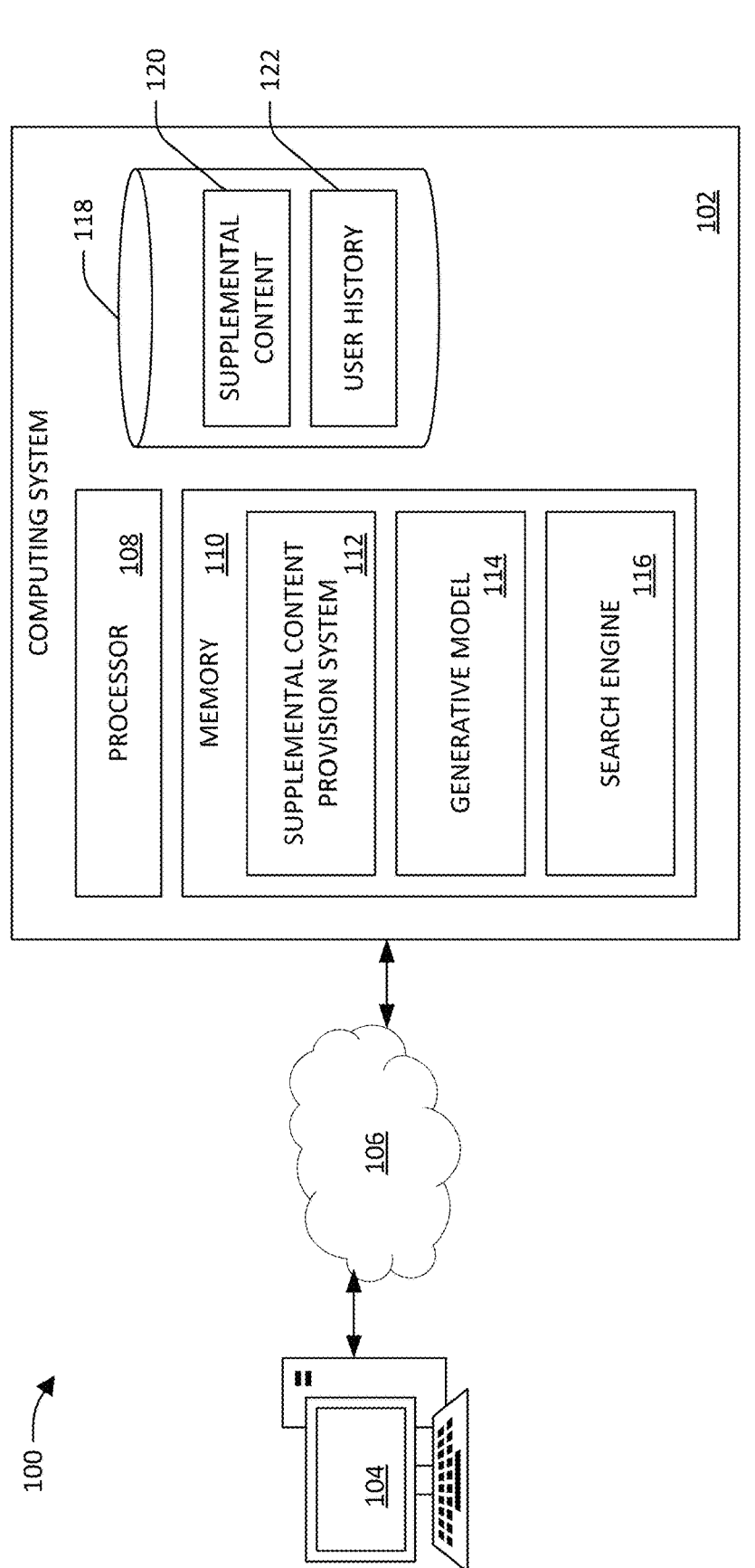
FIG. 1 is a functional block diagram of a computing environment that facilitates provision of supplemental content based upon output of a generative model.

Various technologies pertaining to utilization of a generative model, such as a GLM, in connection with providing supplemental content on webpages are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "system", "engine", and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

The technologies described herein relate to provision of supplemental content to viewers of a webpage based upon output of a generative model. In an example, a generative model can be a "sponsored" generative model that is assigned to a specific company, where the generative model is trained to converse with users about products and/or services offered for acquisition by the company. In such case, the generative model can have access to a database that corresponds to the company, can have access to webpages of the company, and so forth. Hence, in this example, output generated by the generative model is supplemental content. In another example, a generative model is trained to generate text that pertains to a product or service referenced in supplemental content. Such text can be based upon content from webpages of a website of the company that offers the product or service for acquisition. Various other examples are set forth in greater detail herein.

Referring now to FIG. 1, a functional block diagram of a computing environment 100 is illustrated. The computing environment 100 includes a computing system 102 and a client computing device 104, where the computing system 102 and the client computing device 104 are in communication with one another by way of a network 106. The computing system 102 includes a processor 108 and memory 110, where the memory 110 stores instructions that are executed by the processor 108. Specifically, the memory 110 includes a supplemental content provision system 112 that is configured to identify supplemental content to present to a user on a webpage (e.g., a SERP or other suitable webpage). The memory 110 additionally includes a generative model 114 that generates output based upon a prompt. In contrast to conventional technologies, the prompt provided to the generative model 114 can include information in addition to input set forth by a user. For instance, the prompt can include information obtained by a search engine based upon user input, content shown on a webpage, etc. This additional information can be automatically provided to the generative model 114 (e.g., without user intervention). The memory 110 also includes a search engine 116 that conducts searches based upon queries. Queries can be generated by a user or can be generated by the generative model 114 based upon user input. For instance, the generative model 114 receives user input and constructs a query; the generative model 114 provides the query to the search engine 116, whereupon the search engine 116 executes a search based upon the query. At least a portion of search results identified by the search engine 116 can be provided to the generative model 114, whereupon the generative model 114 can generate output based upon such information. Therefore, a prompt provided to the generative model 114 can include, but is not limited to including: 1) user input set forth to the generative model 114 and/or the search engine 116; 2) a query generated by the generative model 114 based upon the user input; 3) information extracted from search results identified by the search engine 116 based upon the user input and/or the query; 4) information in previous prompts employed by the generative model 114 to generate output; and 5) previous outputs of the generative model 114.

The computing system 102 additionally includes a data store 118. The data store 118 stores supplemental content 120 and user history data 122. For instance, the supplemental content provision system 112 can identify supplemental content from the supplemental content 120 based at least in part upon information in the user history 122. Further, as will be described in greater detail below, the generative model 114 can generate output based upon the user history 122. Such output can be employed by the supplemental content provision system 112 to identify and provide supplemental content for presentment on a webpage to a user.

Various graphical user interfaces pertaining to a generative model and/or a webpage are set forth below. Reference will be made to the computing environment 100 with respect to these GUIs where appropriate.

Figure 2:
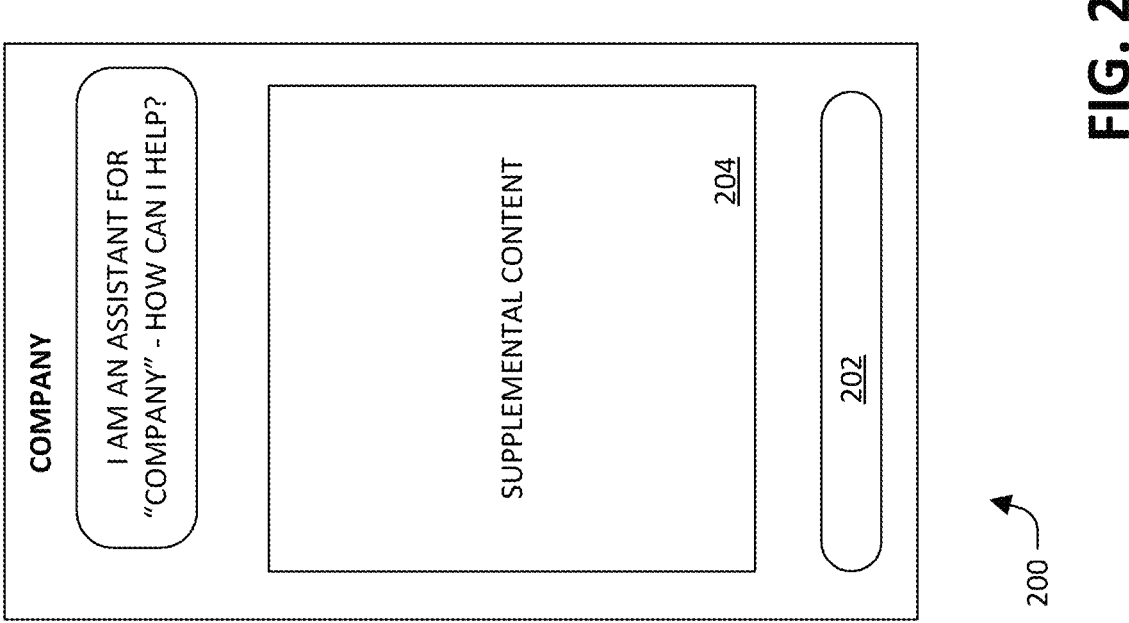
FIG. 2 is a schematic that depicts a graphical user interface (GUI) that corresponds to a generative model that is unique to a company.

Referring now to FIG. 2, a GUI 200 for a generative model that is specific to a company is illustrated (e.g., the generative model is trained on training data identified by the company and/or has access to databases of the company). The GUI 200 can be presented on a SERP and can further be displayed on webpages of a website for the company. Pursuant to an example, the client computing device 104 can receive user input from a user (not shown) and transmit the user input to the search engine 116. The supplemental content provision system 112 identifies supplemental content based upon the user input, where the supplemental content corresponds to the company. Supplemental content 204 identified by the supplemental content provision system 112 is included in the GUI 200. That is, the supplemental content provision system 112 can wrap the supplemental content 201 with GUI features that are specific to the company, where the GUI features include an input field 202 by way of which the user can set forth input to the generative model that is specific to the company. Therefore, as illustrated, the GUI 200 includes the supplemental content 204 identified by the supplemental content provision system 112 and the input field 202 by way of which a user can interact with the generative model that is unique to the company (e.g., the generative model has access to databases of the company, is specifically trained to interact with customers of the company, and so forth).

In addition, the GUI 200 can be presented when a browser executing on the client computing device 104 loads a webpage of the company. Hence, even though the browser is not displaying a SERP, the GUI 200 can be presented on the webpage to the user. Accordingly, the technologies described herein provide the user with the same experience when interacting with the generative model regardless of whether the user is interacting with the generative model by way of the SERP or is interacting with the generative model by way of the webpage of the company. Further, it is contemplated that the generative model 114 can generate insights about the company from the supplemental content 204 identified by the supplemental content provision system 112 as well as identify and summarize information from the website of the company, such that the information provided to the user is personalized to preferences of the user. Thus, the generative model is integrated on both the SERP and the company webpage, whereby the generative model can generate insights and summarize content for the user.

Further, the generative model can be a distilled model that can assist users with navigating webpages of the website of the company. For example, when the user is searching for faucets, the distilled generative model 114 can provide insights, recommendations, complementary products, assist the user while they are searching, etc. The distilled model has limited capabilities when compared to a general purpose generative model and focuses only on products of the company.

Referring to FIG. 3, a flow diagram illustrating a method 300 for presenting supplemental content to a user is depicted. The method 300 starts at 302, and at 304 user input is received from a client computing device; in an example, the user input is received at a search engine, and the user input is in the form of a query that includes keywords.

At 306, supplemental content of a provider is identified based upon the user input received at 304 and/or based upon search results identified by the search engine based upon the query. In an example, the supplemental content can be identified based upon outcome of a keyword auction. In another example, the supplemental content can be identified based upon an entity identified in a search result returned by the search engine.

At 308, a generative model that is assigned to the provider is identified; for example, the generative model can be associated with the supplemental content and/or the provider. The generative model is trained based upon information identified by the provider (e.g., contents of website(s) of the provider, information in database of the provider, and so forth). At 310, a GUI for the generative model is presented on a SERP. The SERP includes, for example, links to webpages identified by the search result as being relevant to the user input, an information card that is relevant to the user input, and the GUI of the generative model. The GUI of the generative model can include the supplemental content; put differently, the supplemental content is wrapped in the GUI of the generative model. The GUI of the generative model includes an input field by way of which the user can set forth input that is related to the supplemental content and/or the provider. In another example, the GUI of the generative model includes a button that, when selected, allows for voice input to be captured by way of a microphone of the client computing device and converted to text input that can be presented to the generative model.

At 312, user input is received by way of the user input field. At 314, output is generated by the generative model and presented in the GUI of the generative model. The generative model generates the output based upon a prompt that includes the user input received by way of the user field. In addition, the prompt can also include information from the supplemental content presented in the GUI. Further, the prompt can also include information from the search results identified by the search engine. Moreover, the prompt can include default information set forth by the provider. Still further, the prompt optionally includes information from a profile of the user, such as historical information of the user, identified preferences of the user, etc. The method 300 completes at 316.

Figure 4:
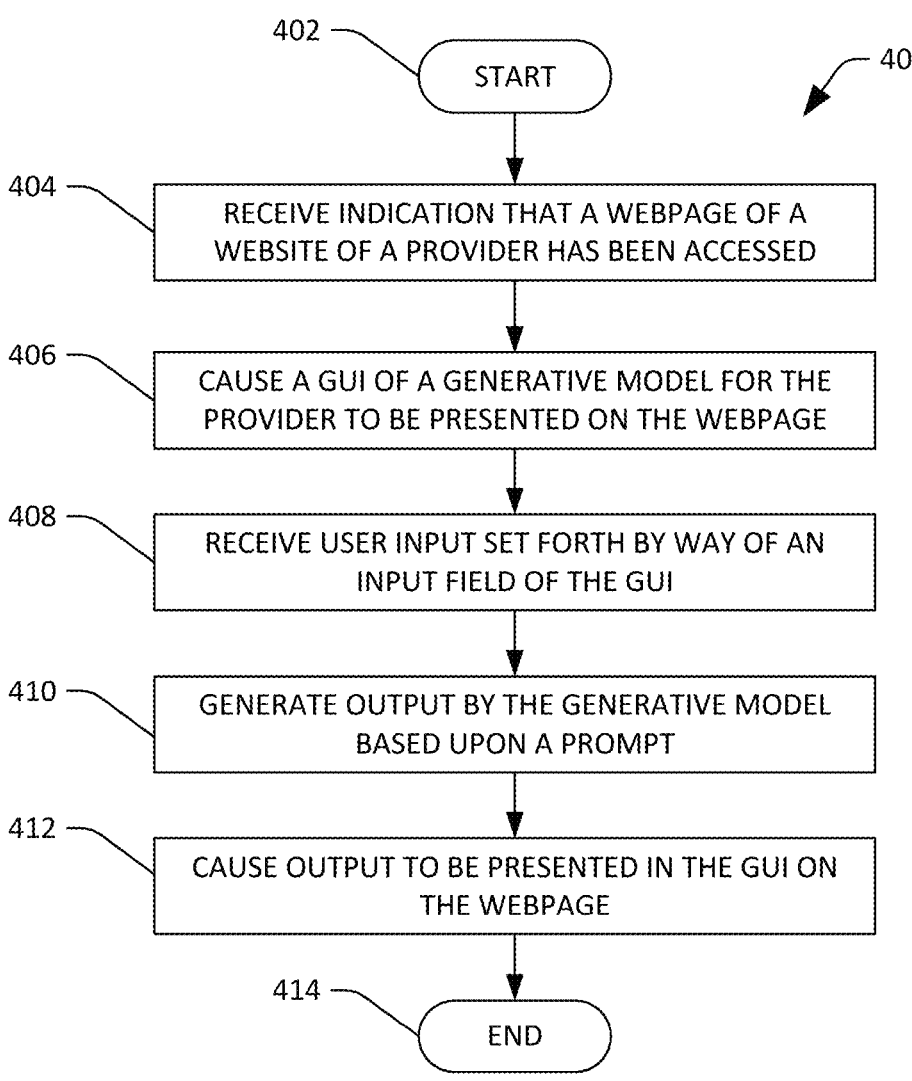
FIG. 4 is a flow diagram that illustrates a method for providing output generated by a generative model to a user, where the generative model corresponds to a website.

Now referring to FIG. 4, a flow diagram illustrating a method for presenting information generated by way of a generative model is illustrated. The method 400 starts at 402, and at 404, an indication is received that a webpage of a website of a company has been accessed by a user of a client computing device is received. In an example, an indication that a web browser executing on the client computing device has loaded the webpage is received. In another example, an indication that an application (other than a web browser) has accessed the webpage to retrieve content of the webpage is received. For instance, the application can be an application for the company, and can be used to browse and/or acquire products or services offered by the company.

At 406, a GUI of a generative model for the company is caused to be presented on the webpage, where the GUI includes an input field by way of which user input can be received. In an example, a computing system executes the generative model in addition to several other generative models of several other providers, and the computing system selects the GUI for the company from amongst several potential GUIs based upon the identifier of the website and/or the identifier of the provider. At 408, user input set forth by way of the input field is received. For instance, a web server transmits the user input to the computing system, and a prompt provided to the generative model includes the user input. The prompt can additionally include content of the webpage. The prompt can optionally include content of other webpages of the website. At 410, the generative model generates output based upon the prompt, and at 412 the output is caused to be presented in the GUI of the generative model on the webpage. For instance, the output is transmitted from the computing system to the web server, which inserts the output into the GUI of the generative model displayed on the webpage. In another example, the output is transmitted from the computing system to the client computing device, whereupon the output is displayed in the GUI of the generative model. The method 400 completes at 414.

Figure 5:
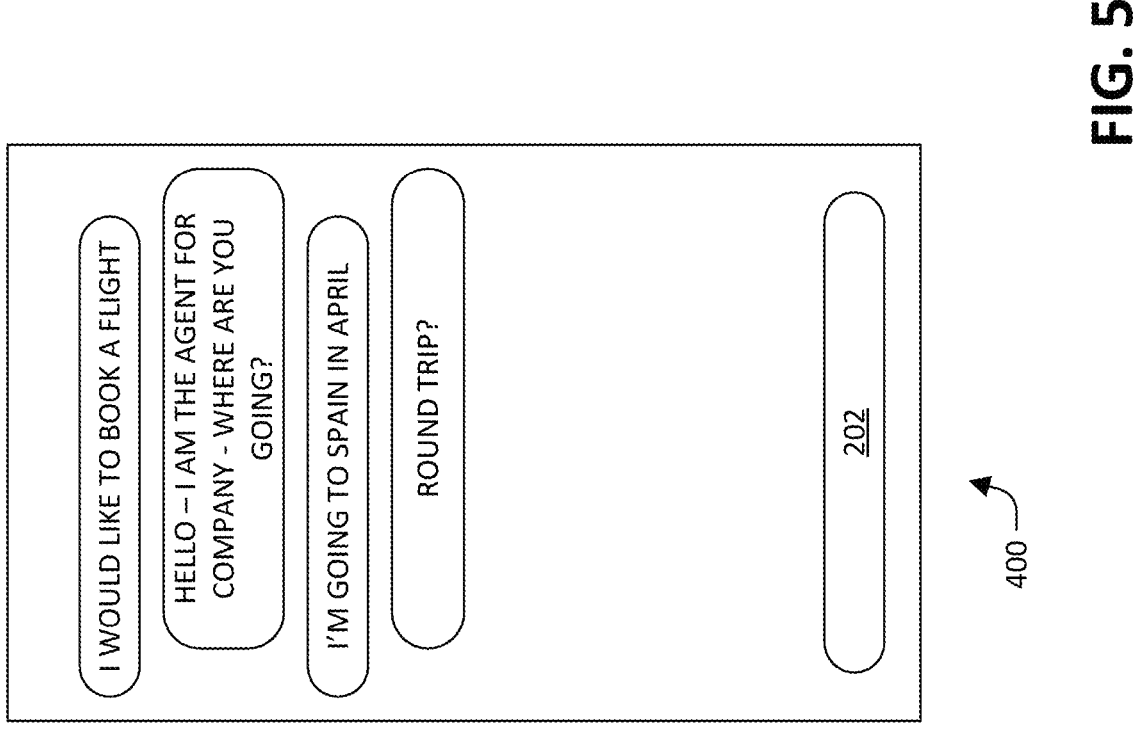
FIG. 5 is a schematic that depicts a GUI, where during a conversation between a user and a generative model, a second generative model is identified, and further where the second generative model continues the conversation with a user.

Now referring to FIG. 5, a GUI 500 corresponding to a generative model is illustrated, where the generative model is specific to a company (provider). In an example, the generative model 114 included in the memory 110 is a general-purpose generative model. Further, while not illustrated, the memory 110 may include several other generative models, with each of the generative models corresponding to a respective company. The GUI 500 includes the input field 202, whereby a user can set forth input to a generative model. In an example, initially, the user input is provided to the generative model 114, such as the input "I would like to book a flight". The generative model 114 can construct an output (not presented to the user) based upon the user input, where the output can identify an entity pertaining to the user input, where the output can be a query that is based upon the user input, etc. The output generated by the generative model can be provided to the supplemental content provision system 112, which can identify supplemental content and/or a provider of supplemental content based upon the output of the generative model 114. In accordance with the example depicted in FIG. 5, the output generated by the generative model 114 an indicate that an intent of the user is to travel, and the supplemental content provision system 112 is provided with such output. The supplemental content provision system 114 identifies a provider of travel services (e.g., an airline company), and further identifies a second generative model (different from the generative model 114) that is assigned to the provider. As described previously, the second generative model is trained based upon information identified by the provider, has access to databases of the provider, etc. The second generative model generates output based upon a prompt, where the prompt includes the user input set forth by way of the input field 202. The prompt can additionally include other information, such as preference information in a user profile, search results identified by the search engine 110 based upon the user input, and so forth. The output generated by the second generative model can be displayed in the GUI 500 together with the output generated by the generative model 114. Subsequent user inputs can be provided to the second generative model, and the second generative model can generate subsequent outputs based upon the subsequent user inputs.

As illustrated, the second generative model can generate the output "Hello—I am the agent for COMPANY. Where are you going?". In this example, the second generative model and/or the content provided by the second generative model can be the supplemental content. In an example, the company that corresponds to the second generative model is charged a fee for the conversation undertaken between the user and the second generative model. After the user sets forth input indicating that the conversation is complete (e.g., requests a new topic), user inputs are provided to the generative model 114.

Figure 6:
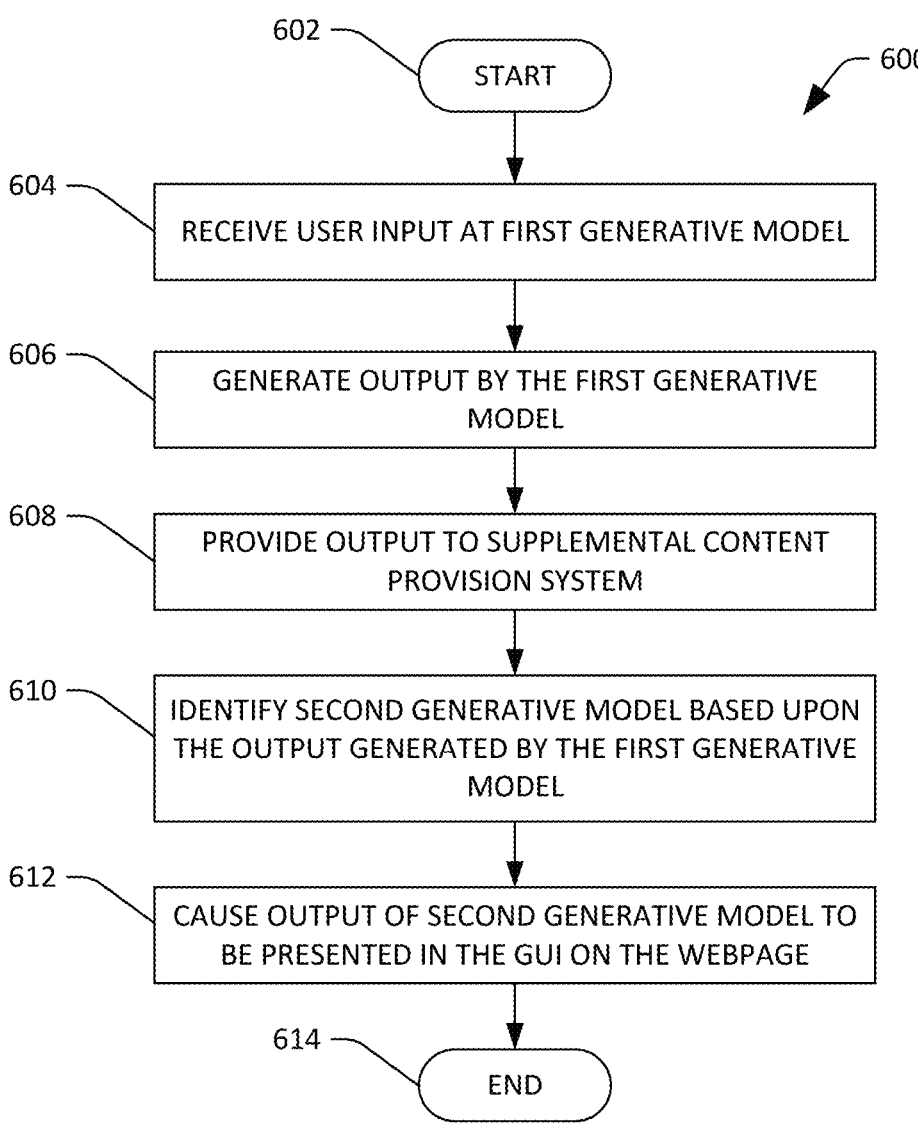
FIG. 6 is a flow diagram that illustrates a method for presenting output of a generative model to a user.

Turning to FIG. 6, a method 600 performed by a computing system that executes multiple generative models is presented. The method 600 starts at 602, and at 604 user input is received at a first generative model. At 606, the first generative model generates output based upon the user input (and optionally based upon other information, such as information extracted from search results identified by a search engine based upon the user input and/or a query generated by the first generative model based upon the user input). At 608, the output is provided to a supplemental content provision system, and at 610 the supplemental content provision system identifies a second generative model based upon the output generated by the first generative model. As noted previously, the second generative model can be assigned to a provider and can be trained based upon information that is associated with the provider and can have access to data of the provider. At 612, the second generative model generates second output based upon the user input received at 604, where the supplemental content provision system provides the user input to the second generative model. The second output is presented to the user by way of a GUI. The method 600 completes at 614.

Figure 7:
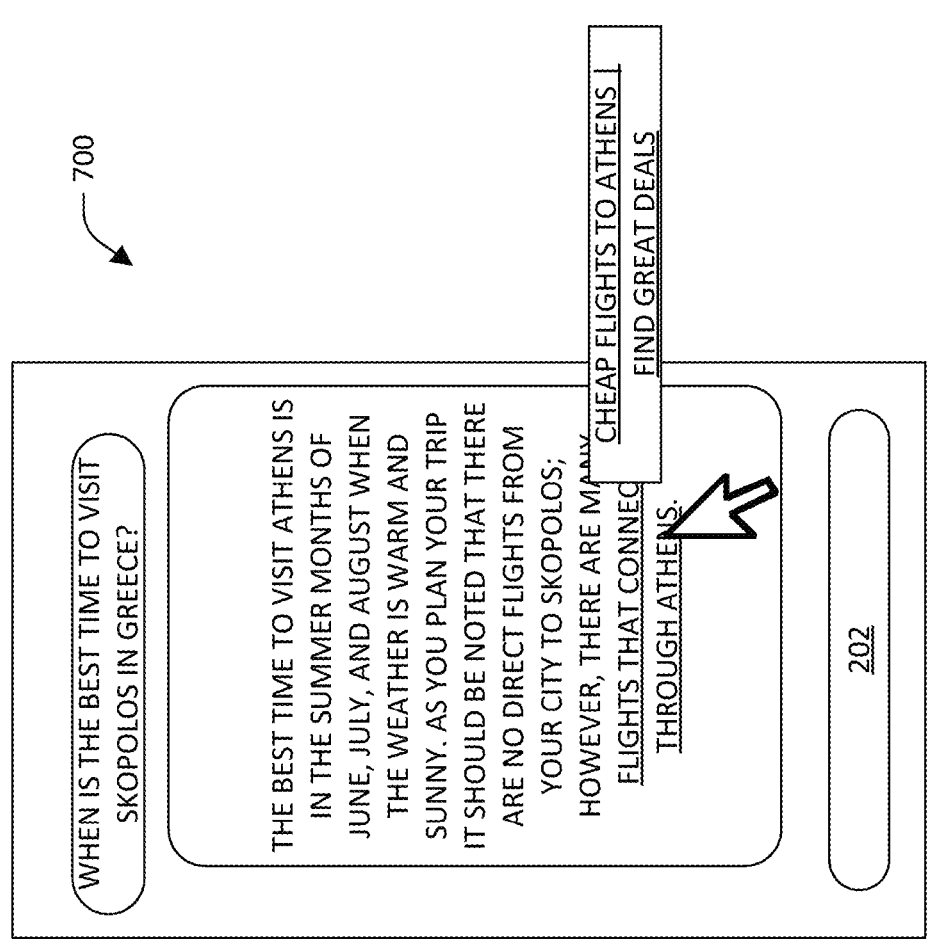
FIG. 7 is a schematic that depicts a GUI where a hyperlink is assigned to a portion of output generated by a generative model, and further where supplemental content is presented upon a pointer being hovered over the hyperlink.

With reference now to FIG. 7, another GUI 700 that corresponds to the generative model 114 is presented. In the example GUI 700, the user is having a conversation with the generative model 114 about traveling to a city in Greece. The generative model 114 generates output based upon a prompt, where the prompt includes the input set forth by user of the client computing device 104. Further, as described above, the generative model 114 can generate the output based upon search results identified by the search engine 116, where the search engine 116 identifies the search results based upon the received user input and/or a query generated by the generative model 114 based upon the received user input.

In addition, the output of the generative model 114 can be analyzed to ascertain whether content in the output corresponds to a supplemental content item (or a provider of a supplemental content item). In an example, the generative model 114 (or another instance of the generative model 114) can analyze the output and identify text therein that corresponds to a supplemental content item. In another example, a second generative model is trained to identify text that corresponds to a supplemental content item. In still yet another example, the output generated by the generative model 114 is provided to the supplemental content provision system 112, and the supplemental content provision system 112 identifies a supplemental content item based upon the output. In still yet another example, the generative model 114 (or another instance of the generative model 114) can generate a summary of the output of the generative model 114 and can provide the summary to the supplemental content provision system 112. The supplemental content provision system 112 can identify a supplemental content item based upon the summary.

Pursuant to an example, upon determining that text in the output corresponds to a supplemental content item, the generative model 114 can assign a hyperlink to such text (underlined for presentment to the user), where upon hover of the user over the hyperlinked text the identified supplemental content item 902 is presented. When the user selects the hyperlinked text in the conversational output or when the user selects the supplemental content item 902, a webpage corresponding to the supplemental content item 902 can be loaded by a web browser.

There are several approaches that can be used in connection with identifying and highlighting text in output as corresponding to a supplemental content item. In a first example, the generative model 114 generates the output based upon the input set forth by the user of the client computing device 104 and, optionally, search results identified by the search engine 116 that are presented to the user (based upon a query set forth by the user to the search engine 116) or based upon search results identified by the search engine 116 based upon the input set forth to the generative 114 or a query generated by the generative model 114. Notably, the output is not based upon supplemental content items. The conversational output generated by the generative model 114 is then provided to a second generative model that analyzes the output for text that may correspond to a supplemental content item.

In a second example, the generative model 114 is provided with the user input, search results identified by the search engine 116, and supplemental content item information. The supplemental content item information, however, is labeled as such in the prompt provided to the generative model 114, and the generative model 114 does not generate the conversational output based upon information about the supplemental content items. Once the generative model 114 generates the output, the generative model 114 can employ the information pertaining to the supplemental content items in connection with identifying text in the conversational output that corresponds to one or more supplemental content items. This approach saves a call that is to be made to another generative model, as the generative model 114 already has the information pertaining to supplemental content items.

Figure 8:
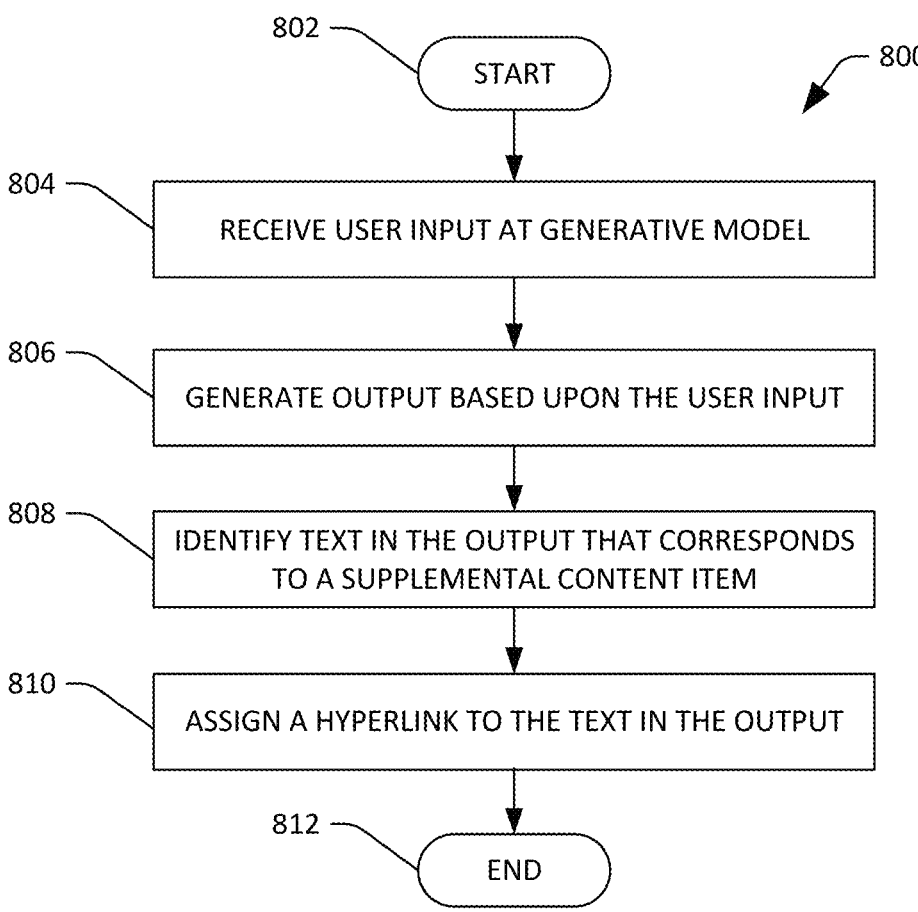
FIG. 8 is a flow diagram that illustrates a method for assigning a hyperlink to text in output of a generative model, where the hyperlink corresponds to a supplemental content item.

With reference now to FIG. 8, a flow diagram illustrating a method 800 for assigning a hyperlink to text in output of a generative model is illustrated. The method 800 starts at 802, and at 804 user input is received at a generative model. Optionally, the generative model generates a query based upon the user input and provides the query to a search engine, and the search engine identifies search results based upon the query.

At 806, the generative model generates output based upon the user input (and optionally based upon at least some of the search results identified by the search engine). At 808, text that corresponds to a supplemental content item in the output generated by the generative model is identified. As described above, the generative model can analyze the output and identify text therein that corresponds to a supplemental content item. In another example, a second generative model receives the output and identifies text therein that corresponds to a supplemental content item. In yet another example, the output is provided to the supplemental content provision system 112, and the supplemental content provision system 112 identifies text therein that corresponds to a supplemental content item.

At 810, a hyperlink is assigned to the text in the output, and the hyperlinked text is presented at a client computing device. When the hyperlinked text is hovered upon, the supplemental content item can be presented (e.g., as a popup window). When the hyperlinked text is selected (or the supplemental content item is selected), a webpage (landing page) corresponding to the supplemental content item is loaded by a web browser and presented on the display of the client computing device. The method 800 completes at 812.

Figure 9:
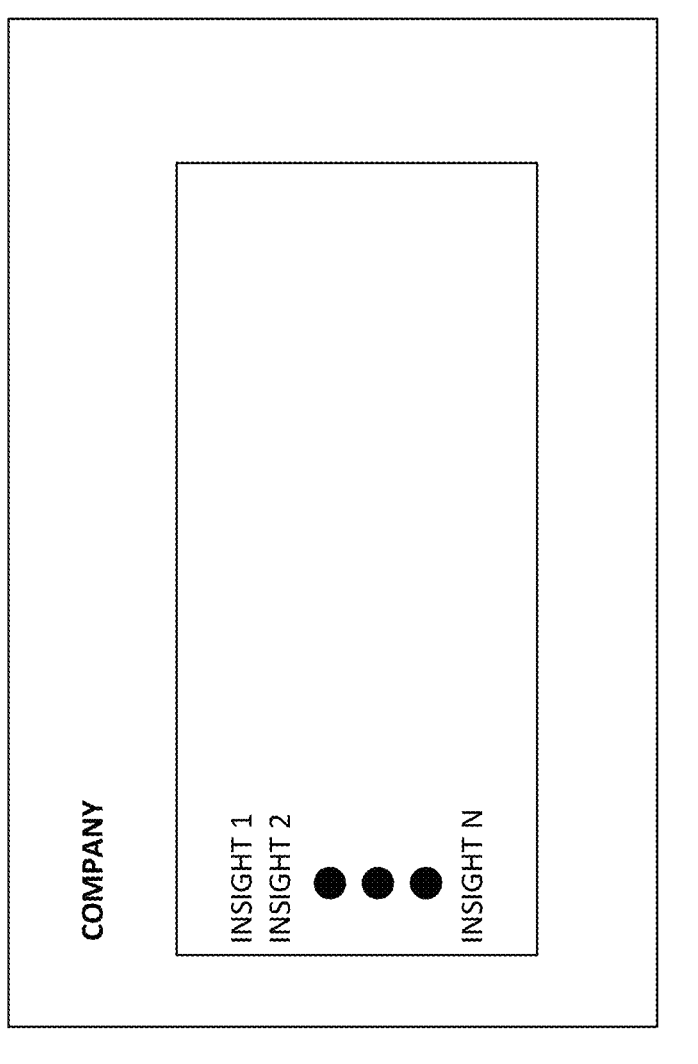
FIG. 9 is a schematic that depicts supplemental content pertaining to a company, where the supplemental content includes information generated by a generative model.

In addition to the functionalities discuss above, the generative model 114 can also generate content that can be included in a supplemental content item (e.g., the generative model 114 can at least partially construct a supplemental content item). With reference now to FIG. 9, a GUI 900 of a supplemental content that includes at least portions thereof generated by the generative model 114 is illustrated. Pursuant to an example, based upon a query set forth to the search engine 116 by a user of the client computing device 104, based upon a webpage being viewed by the user of the client computing device 104, or other suitable information, the supplemental content provision system 112 identifies a supplemental content item that is to be presented to the user of the client computing device 104. For instance, the supplemental content item can pertain to a company that wishes to indicate that at least one product or service may be of interest to the user of the client computing device 104. The generative model 114 is provided with the supplemental content item identified by the supplemental content provision system 112 and/or an identity of the company that corresponds to the supplemental content item. When the generative model 114 is provided with the identity of the company, webpages of a website of the company can be provided to the generative model 114. In an example, the generative model 114 can construct a query and cause such query to be provided to the search engine 116. The search engine 116 can retrieve search results based upon the query, where the search results include webpages that belong to the website of the company. Information extracted from the search results can be provided to the generative model 114. Based upon the supplemental content item identified by the supplemental content provision system 112 and the webpages of the website of the company, the generative model 114 can generate insights with respect to the company, products offered for acquisition by the company, services offered for acquisition by the company, and so forth.

The insights referenced above can be or include interesting offers set forth by the company, relevance of supplemental content item(s) pertaining to the company to the query, highlighting of information that is relevant to what was searched for by the user, and so forth. In a non-limiting example, the supplemental content item identified by the supplemental content provision system 112 can pertain to a product. A webpage of the website of the company that is offering the product for acquisition can indicate that free shipping is available for products purchased online (and the supplemental content item fails to include information about shipping fees). Despite the supplemental content item not referencing free shipping, the generative model 114 can generate an insight that indicates that free shipping is available from the company. Accordingly, the GUI 900 includes an insights field 902 that comprises insights about the company and/or product and/or service pertaining to the supplemental content item identified by the supplemental content provision system 112.

In yet another example, the generative model 114 is well suited for use in connection with mobile computing devices. For instance, a voice agent can be triggered on a mobile computing device when the user of the mobile computing device is inactive for some threshold amount of time. Thus, the generative model 114, through voice interaction, can assist the user with parsing search results by using voice as an interaction mode. In an example, the voice based agent (the generative model 114) promotes supplemental content items, search results identified by the search engine 116, and the like. The voice agent can be triggered based upon one or more metrics, such as an amount of time that the user is viewing a webpage, or other indication that the user may need additional help when reviewing content on webpages. The generative model 114 can generate voice-based conversational output based upon, for example, search results presented on a SERP, content of a webpage presented on the mobile device, and so forth. The generative model 114 can summarize content on webpages in a meaningful way rather than simply reading results.

The generative model 114 can also be employed to provide a user with additional information pertaining to a company that is offering a product or service for acquisition.

A conventional search engine includes a vertical pertaining to shopping, where when the user issues a query to such vertical, the search engine sets forth supplemental content items from a variety of retailers that offer such product or service for acquisition. While some of the companies that correspond to these supplemental content items are typically well-known, others may be smaller retailers and less well-known, and the user may have to do independent research before deciding to purchase from such retailers. The generative model 114 can be employed to provide additional information about this type of retailer to the user, thereby allowing the user to make an educated decision about purchasing the product. For example, the generative model 114 can obtain information from social media sites pertaining to reviews of the company, can obtain information from a website of the company, can obtain information from a knowledge graph used by the search engine 116, and so forth. Moreover, the generative model 114 can obtain information about recent news events, social media posts, and so forth to generate semantically meaningful information about the company. In an example, the search engine 116 retrieves such information based upon queries generated by the generative model 114.

Figure 10:
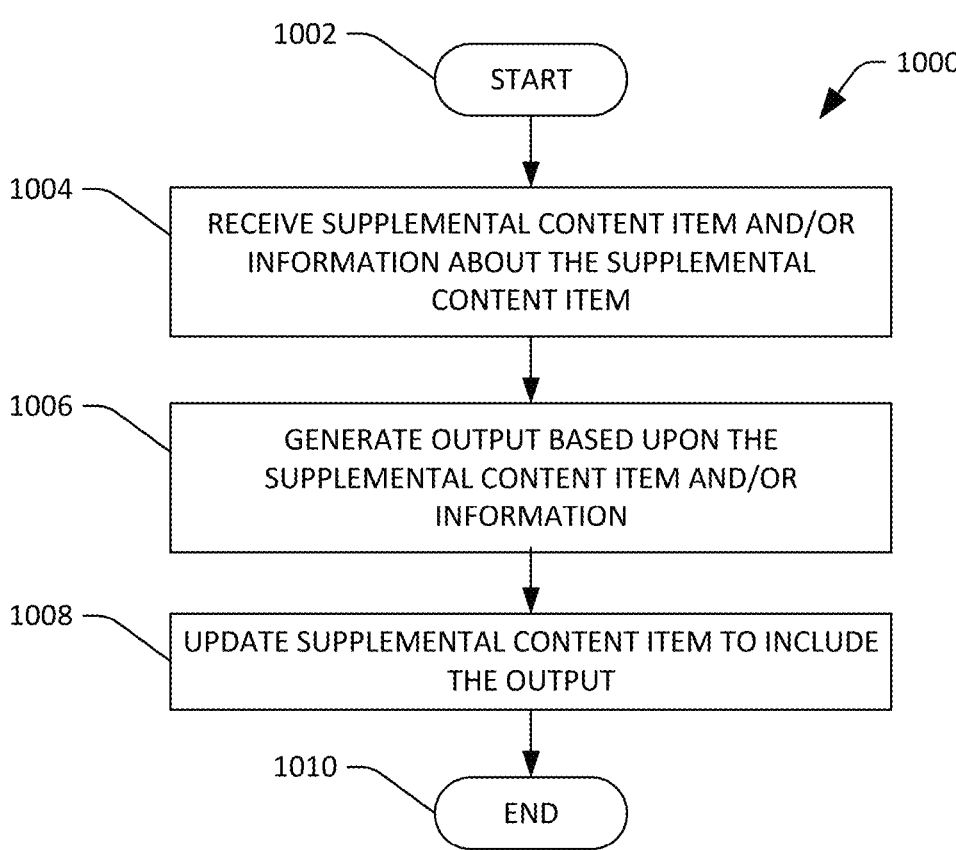
FIG. 10 is a flow diagram that illustrates a method for updating a supplemental content item to include content generated by a generative model.

With reference to FIG. 10, a method 1000 performed by a generative model is illustrated. The method starts at 1002, and at 1004 a supplemental content item that has been selected for presentment to a user of a client computing device is received as input and/or information about the supplemental content item is received as input. The information can include an identity of a product, an identity of a service, an identity of a provider of the product, an identity of a webpage corresponding to the product or service, and so forth. At 1006, the generative model generates output based upon the supplemental content item and/or information received at 1002. At 1006, the supplemental content item is updated to include the output generated by the generative model. The method 1000 completes at 1008.

Figure 11:
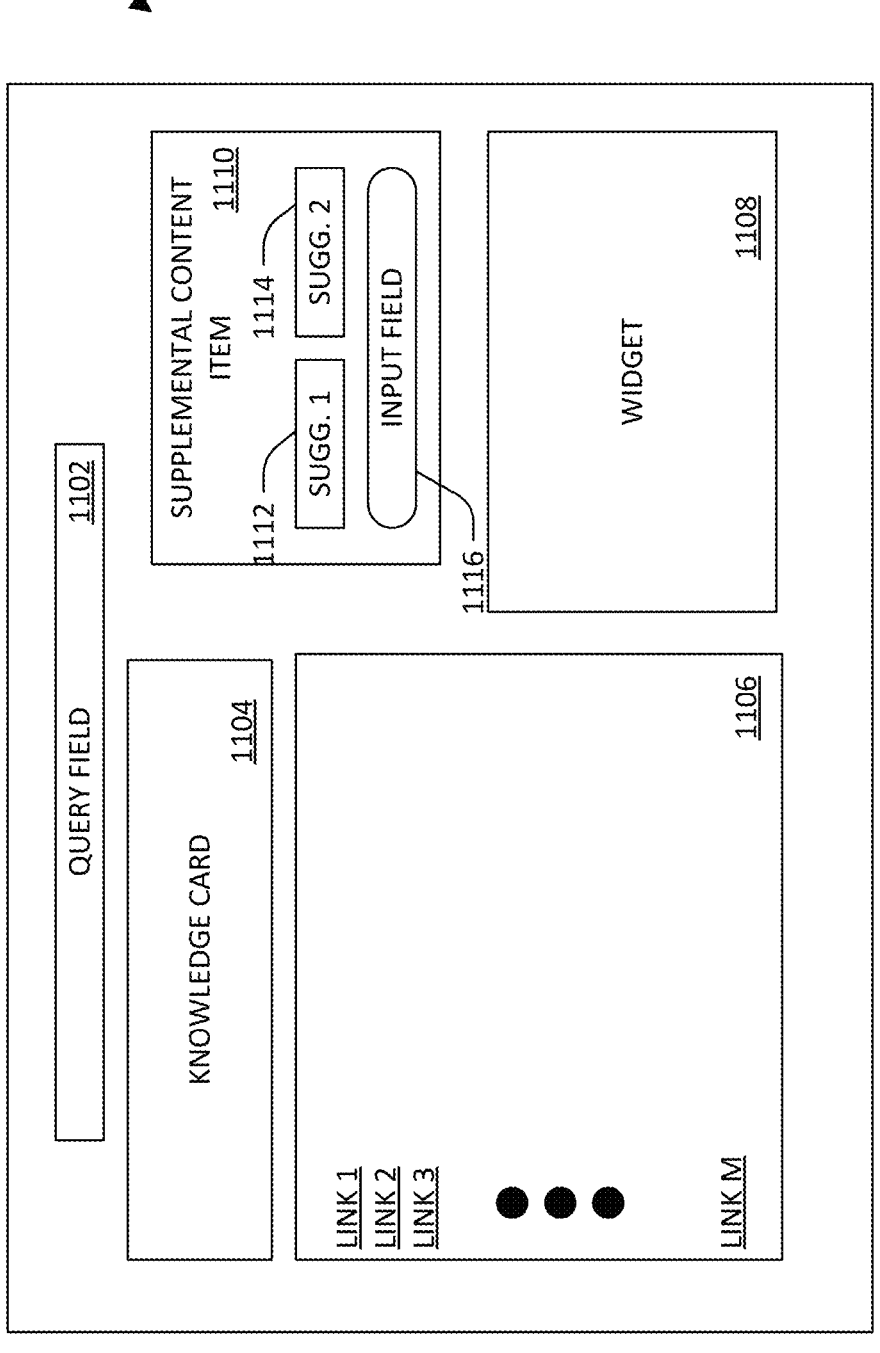
FIG. 11 is a schematic that depicts a GUI of a SERP, where the GUI includes supplemental content, and further where the supplemental content includes interfaces to interact with a generative model.

Now referring to FIG. 11, a GUI 1100 of a SERP is presented. The SERP includes a query field 1102 by way of which the user of the client computing device 104 can set forth a query. The search engine 116 searches over a variety of different data sources based upon such query to generate search results. For instance, the search results can include a knowledge card 1104 that depicts information about an entity referenced in the query, a field 1106 that includes links to webpages identified by the search engine 116 as being relevant to the query, a widget 1108 that the search engine 116 has identified as being relevant to the query, and a supplemental content item 1110 identified by the supplemental content provision system 112 (e.g., based upon the query). In contrast to conventional approaches, the supplemental content item 1110 includes features that allow for interaction with the generative model 114 (e.g., where the generative model 114 is assigned to a company that corresponds to the supplemental content item 1110). For instance, the supplemental content item 1110 includes suggestion chips 1112 and 1114, where selection of a suggestion chip causes conversational input represented in the suggestion chip to be provided to the generative model 114 (thereby initiating a conversation with the generative model 114 about a product, service, company, etc. pertaining to the supplemental content item 1110). Further, the supplemental content item 1110 can include or have graphically associated therewith an input field 1116 by way of which the user of the client computing device 104 can set forth conversational input to the generative model 114. Put differently, the supplemental content item 1110 can be visually wrapped with features pertaining to the generative model 114. In an example, the generative model 114 generates the suggestion chips 1112 and 1114 based upon information pertaining to the supplemental content item 1110 and/or information pertaining to a provider associated with such item 1110. The information noted above can be obtained directly from the supplemental content item 1110 and/or a webpage associated with the provider.

In this case, the supplemental content item 1110 and/or the graphical features can indicate to a user of the client computing device 104 that the generative model 114 is assigned to the company. The generative model 114 can be customized by the company (such that it can perform a soft sell, hard sell, have access to inventory of the company, and so forth). While the supplemental content item 1110 is illustrated as being on a SERP, it is understood that a supplemental content item wrapped with features pertaining to the generative model 114 can appear on any suitable webpage or web application where supplemental content items are presented.

In an example, application programming interfaces of the generative model 114 are exposed to companies, thereby allowing such companies to plug in content for the generative model 114 to use in conversation (such as price feeds, availability, deep web data, data behind databases, product support databases, specifications, features, a selling deck for a product, etc.). Further, meta HTML tags can be exposed on pages to provide the generative model 114 with additional information about how to converse with the user, what to say to the user, rules of conversation, politeness, and so forth. In another example, the generative model 114 is customized for the company, thereby allowing the company to control content output by the generative model 114.

Figure 12:
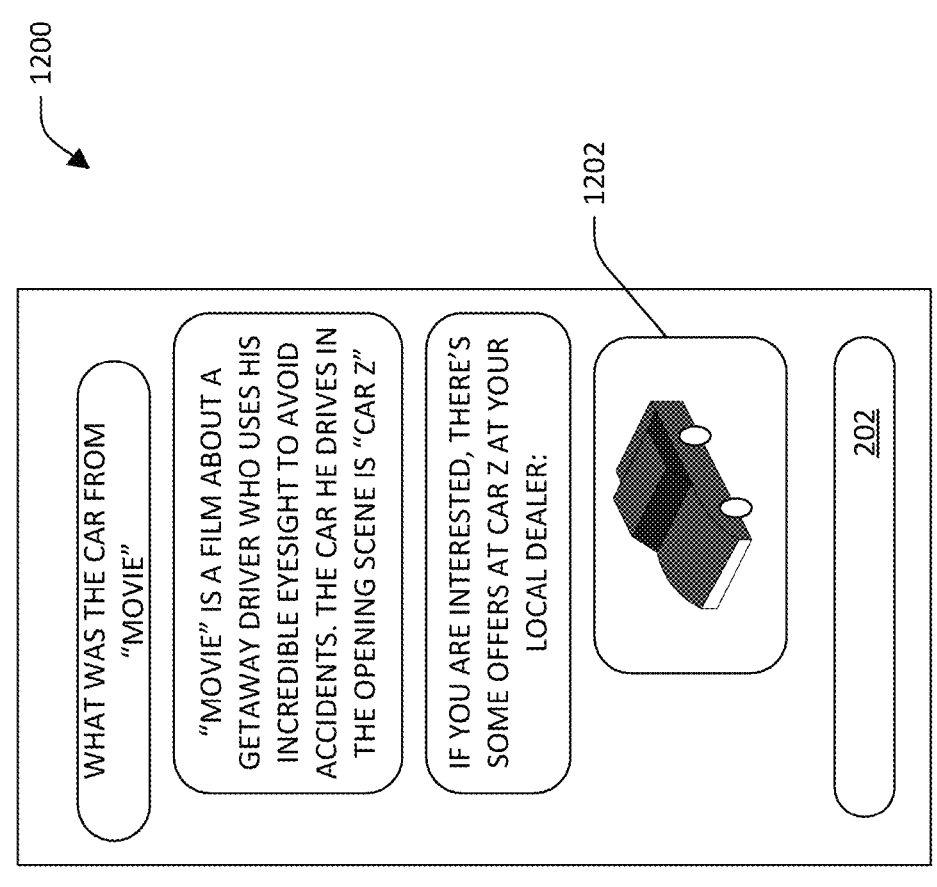
FIG. 12 is a schematic that depicts a GUI that corresponds to a generative model, where supplemental content is inserted in a conversation between a user and the generative model.

With reference now to FIG. 12, a GUI 1200 pertaining to the generative model 114 is presented. The GUI 1200 indicates that a supplemental content item 1202 can be presented within a conversation being conducted between the user of the client computing device 104 and the generative model 114. In the example shown in FIG. 12, the user of the client computing device 104 is conversing with the generative model 114 about a particular type of automobile found in a movie that is of interest to the user of the client computing device 104. The generative model 114 is provided with information that identifies the brand and year of the automobile. As illustrated, the generative model 114 receives the input "what was the car from 'movie'?"; the generative model 114 can construct a query (e.g., "car from the film 'movie'") and provide the query to the search engine 116. The search engine obtains search results based upon the query and provides at least some of the search results to the generative model 114.

The generative model 114 can further ascertain that the user of the client computing device 104 has shown interest in such automobile based upon content of the conversation (and optionally a portion of the user history 122) and can indicate to the supplemental content provision system 112 that the user is interested in the automobile. In an example, the generative model 114 provides the generated query to the supplemental content provision system 112, and the supplemental content provision system 112 identifies a supplemental content item based upon the query. The supplemental content provision system 112 causes the supplemental content item 1202 to be presented within the flow of the conversation. For instance, the supplemental content provision system 112 provides the supplemental content item 1202 to the generative model 114, and the generative model 114 inserts the supplemental content item 1202 within the flow of the conversation between the user of the client computing device 104 and the generative model 114.

In an example, a fee structure can be put in place such that the company corresponding to the supplemental content item 1202 can be assessed for placement of the supplemental content item 1202 in the conversation, can be assessed per conversation turn pertaining to the automobile, can be assessed when the supplemental content item 1202 is selected, and so forth.

While some examples of functionality that can be performed by the supplemental content provision system 112, the generative model 114, and the search engine 116 have been described above, various other functionalities are also contemplated. In an example, the generative model 114 generates a narrative pertaining to multi-click supplemental content items. Specifically, today, sites generate "top deals for X" lists that are composed of sets of supplemental content items. These form a broad class of two-click experiences. In addition to the supplemental content items themselves, which can be supplemented by output of the generative model 114, native content generated by the generative model 114 can be placed that is configured to influence user behavior with respect to supplemental content items. For instance, the generative model 114 can generate the equivalent of a compelling story about how a particular product was used at a pivotal moment in time. To do so, the generative model 114 can be given context of existing supplemental content items that form the core of a native experience and can generate a narrative based upon the set of supplemental content items. In such an example, the prompt used by the generative model 114 includes information from the supplemental content items and instructions to generate a narrative pertaining to such items.

In yet another example, the GLM 114 generates a semantic representation of interests of a user based upon history of the user interacting with webpages, supplemental content items, search results, etc. For instance, the user of the client computing device 104 can provide consent for their history to be analyzed, such that the user history 122 includes information about the user. The generative model 114 receives such user history and generates a semantic representation of interests of the user based upon the user history. The generative model 114 provides advantages over conventional approaches, as the generative model 114 is able to set forth reasoning behind the user history of the user. Accordingly, given the user history, the generative model 114 can summarize the history into a few phrases/sentences that summarize the interests of the user. The supplemental content provision system 112 can be provided with this summary and can employ such information when selecting supplemental content items to provide to the user of the client computing device 104.

Further, the generative model 114 can be configured to assign labels to supplemental content items in the supplemental content 120. Conventionally, a significant amount of time and resources is required to obtain data about relevance of supplemental content items to queries, relevance of supplemental content items to keywords, relevance of supplemental content items to users or sets of users, and so forth. The generative model 114 can be provided with supplemental content items in the supplemental content 120 and assign labels to the supplemental content items that are indicative of relevance to particular queries, keywords, sets of users, and so forth. Further, the generative model 114 can translate supplemental content items from one language to another, such that the generative model 114 can assign labels to supplemental content items in different languages using a single prompt. In such a case, the prompt provided to the generative model 114 can be designed to cause the generative model 114 to perform these tasks.

Moreover, the generative model 114 can be configured to generate supplemental content items entirely or can be configured to generate portions of the supplemental content items (titles, description, etc.). Conventionally, titles of supplemental content items are automatically generated for various products and/or services; however, conventionally, the content that is generated is not personalized (either for an end user who is provided with the supplemental content item or a company that corresponds to the supplemental content item). The generative model 114 can generate content for a supplemental content item, such as title, description, site links, and so forth, where such content can be generated based upon user information (e.g., a set of users that correspond to a particular demographic), information about a company, information extracted from a webpage (e.g., that describes a product), etc. For example, the supplemental content items can be generated offline, and content from the user history 122 can be employed to identify an appropriate supplemental content item that has portions thereof generated by the generative model 114. To generate such supplemental content item portions, the generative model 114 can access the user history 122 and, for example, a landing page for a product, information about a company, and so forth, and the generative model 114 can generate the portions based upon such information.

Additionally, input set forth by the user of the client computing device 104 to the generative model 114 can be leveraged in connection with constructing a profile of the user when the user has consented to analysis of input. For instance, the generative model 114, based upon rich contextual information from a dialogue between the user and the generative model 114, can construct an embedding for the user to allow for more targeted and personalized retrieval of supplemental content for the user. In an example, context from a dialogue between the user and the generative model 114 can be incorporated into a user representation as a near real time signal in connection with identifying a supplemental content item for presentment to the user.

In connection with providing supplemental content items to users, agents for companies often set forth bids for space on webpages where the supplemental content items are to be displayed. Currently, advertising networks and advertisers employ estimates for bids prior to an advertising campaign being launched in connection with estimating demand for supplemental content items, revenue corresponding to supplemental content items, and so forth. In an example, the generative model 114 can be employed to provide predictive modeling in connection with estimating bids corresponding to supplemental content items. That is, features utilized in connection with estimating bids can be augmented with richer feedback from conversational content between the generative model 114 and the user. Hence, a contextual embedding vector generated by the generative model 114 can be a feature used to represent user engagement, interests, and click feedback, which in turn can be used to estimate bids.

The generative model 114 can also be employed in connection with generating images for supplemental content items. Images tend to be fairly important in connection with certain types of electronic advertising. However, a company may not associate images with all supplemental content items to be employed by the company. Accordingly, the generative model 114 can be employed to generate queries used by the search engine 116 to retrieve images that can be assigned to textual supplemental content items and/or can be used to generate images that are to be assigned to textual supplemental content items.

Various other features are also contemplated. For instance, a supplemental content item can be triggered when the user of the client computing device 104 mentions a particular word or entity (or something related to the word or entity) in conversation with the generative model 114. For instance, the supplemental content item can be presented in conversation as an arbitrary widget (image) or a more subtle conversational reply, like "have you considered car Y?" The generative model 114 can be configured to perform intent detection to trigger identification of a supplemental content item and for response generation with specific content. Conversational output generated by the generative model 114 associated with a supplemental content item can be marked indicating that the supplemental content item pertains to a company (e.g., is sponsored). In such case, the supplemental content item can appear in the flow of conversation or can be displayed on other services on a webpage.

Similarity-based advertisement bidding is also contemplated. Advertisers can write a full blown textual description of types of users and/or search and conversation activities that they are trying to target. Such textual description (paragraph, sentences, etc.) can be embedded into a vector by the generative model 114. Advertisers can bid for placement based on vector similarity of their description and the user activity (e.g., dialogue history, search history, and so forth). Embeddings allow for disambiguation of search intent (whether the term "tiger" refer to an animal or a sporting team). The generative model 114 can appropriately weigh content in dialogue turns that are generated from the user versus those generated by the generative model 114, and the embedding can be multimodal and jointly trained to embed a combination of text, speech, visual content, and/or nonvisual metadata that is present. Such contextual embedding can be sent directly to the search engine 116 to further improve search relevance.

The generative model 114 can represent semantics of large segments of text fairly accurately. When users converse in dialogue, individual keywords may not be particularly useful to allow bidding from advertisers wishing to engage users interested in specific topics. Instead, the recent conversation history embedding captures many attributes of the conversations such as user interests and preferences. Preprocessing of the text and training/validation of the embedding can be performed to remove certain biases from the embedding and ensure that disallowed targeting criteria are removed. The generative model 114 can perform these tasks to generate training data to condition the embedding to be unbiased for such restrictions.

Advertisers can submit bids on an arbitrary block of text that gets embedded. A nearest neighbor similarity lookup can be performed in real-time or near real-time against user content and advertisers can be charged in proportion to the similarity. This model can be integrated into existing keyword auction mechanisms. Nonlinear pricing functions can be applied depending upon the similarity and number of competing bids.

Still further, the generative model 114 can be used in connection with optimizing advertisements, to assist advertisers in generating content so that the generative model 114 can sell a product over a competitor product. In an example, a second generative model can be trained to imitate/simulate human users. User personalities can be drawn from real user conversations (on other topics) and distilled into customer profiles. Categories of users can be learned from conversational logs. Outcomes of such simulated conversations can be monitored and used to modify supplemental content items—for instance, whether the simulated user engaged with an advertisement, sentiment of responses of the simulated user, and so forth can be tracked and used in connection with modifying advertisements. Pursuant to an example, an advertisement can be automatically modified until a desired outcome is achieved.

Referring now to FIG. 13, a high-level illustration of an exemplary computing device 1300 that can be used in accordance with the systems and methodologies disclosed herein is illustrated. For instance, the computing device 1300 may be used in a system that is configured to provide content displayed in a web browser as at least a portion of a prompt to a GLM. By way of another example, the computing device 1300 can be used in a system that is configured to present supplemental content items to users. The computing device 1300 includes at least one processor 1302 that executes instructions that are stored in a memory 1304. The instructions may be, for instance, instructions for implementing functionality described as being carried out by one or more components discussed above or instructions for implementing one or more of the methods described above. The processor 1302 may access the memory 1304 by way of a system bus 1306. In addition to storing executable instructions, the memory 1304 may also store prompts, images, supplemental content items, user history, dialogs, etc.

The computing device 1300 additionally includes a data store 1308 that is accessible by the processor 1302 by way of the system bus 1306. The data store 1308 may include executable instructions, instant answers, a web index, etc. The computing device 1300 also includes an input interface 1310 that allows external devices to communicate with the computing device 1300. For instance, the input interface 1310 may be used to receive instructions from an external computer device, from a user, etc. The computing device 1300 also includes an output interface 1312 that interfaces the computing device 1300 with one or more external devices. For example, the computing device 1300 may display text, images, etc. by way of the output interface 1312.

It is contemplated that the external devices that communicate with the computing device 1300 via the input interface 1310 and the output interface 1312 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1300 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1300 may be a distributed system. Thus, for instance, several devices may be in communication by way of a network connection and may collectively perform tasks described as being performed by the computing device 1300.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Various methods have been disclosed herein relating to generative models and supplemental content items. While the methods are shown and described as being a series of acts that are performed in a sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

In addition, various technologies have been described herein relating to presenting supplemental content in accordance with at least the following examples:

(A1) In an aspect, a method is disclosed herein, where the method includes providing a prompt to a generative model. The generative model is configured to generate output based upon the prompt. The generative model is also configured to identify that text in the output is to be associated with a supplemental content item. The generative model is additionally configured to assign a hyperlink to the text in the output. The method also includes causing the output to be displayed upon a display of a client computing device, where the text in the displayed output has the hyperlink assigned thereto, and further where upon the hyperlink being hovered over, the supplemental content item is displayed concurrently with the output on the display.

(A2) In some embodiments of the method of (A1), upon the hyperlink being selected, a webpage pertaining to the supplemental content is loaded by a web browser of the client computing device and presented on the display.

(A3) In some embodiments of the method of at least one of claims (A1)-(A2), the method also includes receiving user input, where the user input is included in the prompt, and further where the user input is received prior to the prompt being provided to the generative model.

(A4) In some embodiments of the method of (A3), the generative model generates a query based upon the user input. In addition, the method further includes providing the query to a search engine, where the search engine identifies a search result based upon the query. The method also includes including at least a portion of the search result in the prompt.

(A5) In some embodiments of the method of at least one of (A1)-(A4), the method also includes several acts that occur subsequent to the output being caused to be displayed on the display of the client computing device. The acts include providing user input to the generative model, where the generative model is configured to generate a query based upon the user input. The acts also include providing the query to a supplemental content provision system, where the supplemental content provision system identifies a second supplemental content item based upon the query. The acts further include providing the second supplemental content item to the generative model. The acts additionally include causing the second supplemental content item to be displayed on the display as part of a conversation between a user and a chatbot.

(A6) In some embodiments of the method of (A5), the method also includes providing the query to a search engine, where the search engine identifies an image based upon the query. The method additionally includes inserting the image into the second supplemental content item.

(A7) In some embodiments of the method of at least one of (A1)-(A6), the prompt includes instructions to refrain from considering information pertaining to the supplemental content item when identifying that the text in the output is to be associated with the supplemental content item.

(A8) In some embodiments of the method of at least one of (A1)-(A6), the prompt includes user history information, and further wherein text in the output is identified as being associated with the supplemental content item based upon the user history information.

(B1) In another aspect, a method performed by a computing system is disclosed, where the method includes receiving a prompt at a generative model. The method also includes generating, by the generative model, output based upon the prompt, where the output includes text. The method further includes identifying, by the generative model, that at least one word in the text is to be associated with supplemental content. The method additionally includes obtaining a hyperlink that points to the supplemental content. The method also includes assigning, by the generative language model that generated the output, the hyperlink to the at least one word in the text of the output. The method further includes causing the output to be displayed on a display, where the at least one word in the text is displayed as having the hyperlink assigned thereto, and further where the supplemental content item is displayed in a graphical user interface (GUI) associated with the generative model together with the output of the generative model in response to the hyperlink being hovered over.

(B2) In some embodiments of the method of (B1), the method also includes receiving an indication that the supplemental content item has been selected. The method further includes updating a prompt of the generative model to include content of a webpage pointed to by the supplemental content item, where the prompt is updated in response to receiving the indication that the supplemental content item has been selected.

(B3) In some embodiments of the method of at least one of (B1)-(B2), the method also includes receiving user input, where the user input is included in the prompt, and further where the user input is received prior to the generative model generating the output.

(B4) In some embodiments of the method of (B3), the method also includes generating, by the generative model, a query based upon the user input. The method further includes providing the query to a search engine, where the search engine identifies a search result based upon the query. The method additionally includes including at least a portion of the search result in the prompt.

(C1) In yet another aspect, a method disclosed herein includes providing a prompt to a generative model, where the prompt includes an instruction to the generative model. The instruction instructs the generative model to: 1) review output that is to be generated by the generative model based upon the prompt for text that is to be associated with a supplemental content item; and 2) assign a hyperlink to the text in the output. The method also includes receiving the output from the generative model, where the output includes the text and the hyperlink assigned to the text. The method additionally includes causing the output to be displayed in a graphical user interface (GUI), where the text has the hyperlink assigned thereto, and further where upon the hyperlink being hovered over, the supplemental content item is displayed concurrently with the output.

(C2) In some embodiments of the method of (C1), upon the hyperlink being selected, a webpage pertaining to the supplemental content item is loaded by a web browser and presented on a display of a client computing device.

(C3) In some embodiments of the method of at least one of (C1)-(C2), the method includes several acts that are performed prior to the prompt being provided to the generative model. These acts include receiving user input and providing the user input to the generative model. The acts also include receiving a query generated by the generative model based upon the user input. The acts additionally include providing the query to a search engine, where the search engine identifies a search result based upon the query. The acts further include including at least a portion of the search result in the prompt.

(C4) In some embodiments of the method of at least one of (C1)-(C3), the method also comprises including the user input and the query generated by the generative model in the prompt.

(C5) In some embodiments of the method of at least one of (C1)-(C4), the method also includes providing user input to the generative model subsequent to receiving the output from the generative model. The method also includes receiving a query generated by the generative model based upon the user input. The method additionally includes providing the query to a supplemental content provision system, where the supplemental content provision system identifies a second supplemental content item based upon the query. The method further includes receiving the second supplemental content item. The method also includes causing the second supplemental content item to be displayed in the GUI as part of a conversation between a user and a chatbot.

(C6) In some embodiments of the method of at least one of (C1)-(C5), the supplemental content item is an electronic advertisement.

(C7) In some embodiments of the method of at least one of (C1)-(C6), the supplemental content item is linked to a webpage by way of the hyperlink. The method also includes receiving user input subsequent to causing the output to be displayed. The method further includes obtaining content from the webpage. The method additionally includes providing a second prompt to the generative model, where the second prompt includes the user input and the content from the webpage, and further where the generative model generates second output based upon the second prompt.

(C8) In some embodiments of the method of at least one of (C1)-(C7), the prompt also includes information pertaining to the supplemental content item. The prompt additionally includes an instruction to refrain from considering the information pertaining to the supplemental content item when generating the output, where the generative model assigns the hyperlink to the text in the output based upon the information pertaining to the supplemental content item.

(D1) In yet another aspect, a system described herein includes a processor and memory, where the memory stores instructions that, when executed by the processor, cause the processor to perform any of the methods disclosed herein (e.g., any of (A1)-(A8), (B1)-(B4), or (C1)-(C8)).

(E1) In still yet another aspect, a computer-readable storage medium comprises instructions that, when executed by a processor, cause the processor to perform any of the methods disclosed herein (e.g., any of (A1)-(A8), (B1)-(B4), or (C1)-(C8)).

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:

a processor; and memory storing instructions that, when executed by the processor, cause the processor to perform acts comprising:

receiving user input set forth by a user of a client computing device;

providing a prompt to a generative model, wherein the prompt comprises at least a portion of the user input;

causing the generative model to, responsive to receiving the prompt, generate output based upon the prompt;

identifying text in the output generated by the generative model that is to be associated with a supplemental content, wherein the supplemental content is not included in the output;

causing the generative model to generate a query for a supplemental content provision system based upon the identified text and the supplemental content;

obtaining, from the supplemental content provision system, a supplemental content item relevant to the query and the supplemental content;

assigning a hyperlink to the identified text in the output, wherein the hyperlink is associated with the supplemental content;

causing the output to be displayed upon a display of the client computing device; and responsive to determining that the hyperlink is being hovered over, causing the supplemental content item to be displayed concurrently with the output on the display.

2. The computing system of claim 1, wherein upon the hyperlink being selected, a webpage pertaining to the supplemental content is loaded by a web browser of the client computing device and presented on the display.

3. The computing system of claim 1, where the generative model generates a second query based upon the user input, the acts further comprising:

providing the second query to a search engine, where the search engine identifies a search result based upon the second query; and including at least a portion of the search result in the prompt.

4. The computing system of claim 1, the acts further comprising:

subsequent to causing the output to be displayed on the display of the client computing device, receiving a second user input;

providing the second user input to the generative model;

causing the generative model to generate a second query for the supplemental content provision system based upon the second user input;

providing the second query to the supplemental content provision system, where the supplemental content provision system identifies a second supplemental content item based upon the query;

providing the second supplemental content item to the generative model; and causing the second supplemental content item to be displayed on the display concurrently with the output.

5. The computing system of claim 4, the acts further comprising:

providing the second query to a search engine, where the search engine identifies an image based upon the second query; and inserting the image into the second supplemental content item.

6. The computing system of claim 1, wherein the prompt includes instructions to refrain from considering information pertaining to the supplemental content item when identifying that the text in the output is to be associated with the supplemental content item.

7. The computing system of claim 1, wherein the prompt includes user history information, and further wherein text in the output is identified as being associated with the supplemental content item based upon the user history information.

8. A method performed by a computing system, the method comprising:

at a generative model, receiving a prompt;

generating, by the generative model, output based upon the prompt, where the output includes text;

identifying, by the generative model, that at least one word in the text is to be associated with supplemental content;

generating, by the generative model, a query for a supplemental content provision system, wherein the query is based upon the identified at least one word and the supplemental content;

obtaining, from the supplemental content provision system, a supplemental content item relevant to the query and the supplemental content;

obtaining a hyperlink that points to the supplemental content;

assigning, by the generative model that generated the output, the hyperlink to the at least one word in the text of the output;

causing the output to be displayed on a display, where the at least one word in the text is displayed as having the hyperlink assigned thereto, and further where the supplemental content item is displayed in a graphical user interface (GUI) associated with the generative model together with the output of the generative model in response to the hyperlink being hovered over.

9. The method of claim 8, further comprising:

receiving an indication that the supplemental content item has been selected; and in response to receiving the indication that the supplemental content item has been selected, updating a prompt of the generative model to include content of a webpage pointed to by the supplemental content item.

10. The method of claim 8, further comprising:

prior to the generative model generating the output, receiving user input, where the user input is included in the prompt.

11. The method of claim 10, further comprising:

generating, by the generative model, a query based upon the user input;

providing the query to a search engine, where the search engine identifies a search result based upon the query; and including at least a portion of the search result in the prompt.

12. A computer-readable storage medium comprising instructions that, when executed by a processor, cause the processor to perform acts comprising:

providing a prompt to a generative model, where the prompt includes an instruction to the generative model, the instruction instructs the generative model to review an output that is generated by the generative model based upon the prompt for text that is to be associated with a supplemental content item, wherein the supplemental content item is not included in the output;

identifying text in the output that is to be associated with the supplemental content item;

generating a query for a supplemental content provision system based upon the identified text;

responsive to executing a search of the supplemental content provision system based upon the query, obtaining the supplemental content item;

assigning a hyperlink to the text in the output, wherein the hyperlink is associated with the supplemental content item;

receiving the output from the generative model, where the output includes the text and the hyperlink assigned to the text; and causing the output to be displayed in a graphical user interface (GUI), where the text has the hyperlink assigned thereto, and further where upon the hyperlink being hovered over, the supplemental content item is displayed concurrently with the output.

13. The computer-readable storage medium of claim 12, wherein upon the hyperlink being selected, a webpage pertaining to the supplemental content item is loaded by a web browser and presented on a display of a client computing device.

14. The computer-readable storage medium of claim 12, the acts further comprising:

prior to providing the prompt to the generative model:

receiving user input;

providing the user input to the generative model;

receiving a second query generated by the generative model based upon the user input;

providing the second query to a search engine, where the search engine identifies a search result based upon the query; and including at least a portion of the search result in the prompt.

15. The computer-readable storage medium of claim 14, the acts further comprising:

including the user input and the second query generated by the generative model in the prompt.

16. The computer-readable storage medium of claim 12, the acts further comprising:

subsequent to receiving the output from the generative model, providing user input to the generative model;

receiving a second query generated by the generative model based upon the user input and the supplemental content item;

providing the second query to the supplemental content provision system, where the supplemental content provision system identifies a second supplemental content item based upon the second query;

receiving the second supplemental content item; and causing the second supplemental content item to be displayed in the GUI concurrently with the output.

17. The computer-readable storage medium of claim 12, where the supplemental content item is an electronic advertisement.

18. The computer-readable storage medium of claim 12, where the supplemental content item is linked to a webpage by way of the hyperlink, the acts further comprising:

subsequent to causing the output to be displayed, receiving user input;

obtaining content from the webpage; and providing a second prompt to the generative model, where the second prompt includes the user input and the content from the webpage, and further where the generative model generates second output based upon the second prompt.

19. The computer-readable storage medium of claim 12, where the prompt further includes:

information pertaining to the supplemental content item; and an instruction to refrain from considering the information pertaining to the supplemental content item when generating the output, where the generative model assigns the hyperlink to the text in the output based upon the information pertaining to the supplemental content item.

* * * * *